Patented July 4, 1939

2,164,635

UNITED STATES PATENT OFFICE 2,164,635

PRODUCTION OF REFRACTORY MATERIAL

Raymond C. Benner and John Charles McMullen, Niagara Falls, N. Y., assignors, by mesne assignments, to The Carborundum Company, Niagara Falls, N. Y., a corporation of Delaware Application December 30, 1935, Serial No. 56,706

3 Claims. (Cl. 49—79)

This invention relates to the production of refractory articles of novel construction for use in the construction of glass tanks and furnaces, etc., and a novel method of producing refractory articles.

Monolithic blocks of refractory material formed by casting are valuable because of their resistance to the corrosive action of slags and glasses, etc., when used in the construction of walls and roofs of furnaces and tanks containing these corrosive agents. However, with certain of the materials used in the production of monolithic refractory articles, it is difficult to obtain an article which is dense and non-porous throughout. Blocks or bricks produced from certain materials are frequently characterized by blow holes and a porous structure in general in their central portion so that the effectiveness of these castings is relatively small compared to the bulk of the block. Furthermore the use to which monolithic blocks are put is frequently such that it is not feasible to utilize the whole block, but necessitates discarding the block after a certain volume has been removed by corrosion. The relatively short life of a refractory block resulting from either of these conditions results in the waste of a large proportion of the refractory material in the block and makes the use of such blocks in those cases relatively expensive.

Our invention provides a remedy for these defects by producing a hollow block which is open to the atmosphere at one face and which may have the walls opposite the opening substantially thicker than the remaining walls whereby it may be used as the face of the block in the inner walls of a tank or furnace to provide an effective thickness just as great as a solid casting which is somewhat porous in the center.

In the production of hollow refractory blocks or cylindrical shaped pieces open on a flat side it is difficulty to form an article by filling a mold with molten material and pouring out the excess molten material after a shell of the desired size has been formed to produce an article in which the edges are relatively smooth and of uniform thickness. As the molten material solidifies at its outer edges the resulting shrinkage lowers the level of molten material whereby an open space is produced in the shell at the top of the molten material. There is a tendency for the molten material to freeze over at various places between its highest and lowest level with the result that useless and troublesome shoulders or re-entrant portions are formed on the inner wall of the resulting article. It is also difficult to keep the portion of the shell exterior adjacent the casting hole smooth and uniform with the remainder of that face due to the deposition of solid material about the exterior of the hole when the molten material is poured from the shell.

Our invention involves therefore, the production of a hollow refractory article which is a shell of dense homogeneous material having an opening therein of substantial area, the shell being slightly re-entrant at the edges of the opening. More specifically our invention contemplates the production of a hollow refractory block having an open face or an opening in a face which is slightly smaller than the corresponding inner face of the block. The invention also involves a new and useful method for producing such refractory articles.

The invention will be described with particular reference to the production of hollow blocks corresponding in size to refractory blocks commonly known as tank blocks whose particular use is in the construction of glass tanks, but it must be understood that these references are for purpose of illustration only, the invention including the production of blocks or other shapes of various sizes and for various uses to which their properties recommend them.

The invention also provides a new and useful mold for the production of hollow refractory articles, the said mold having a shape corresponding to the outer area of the articles to be formed and having extending about its inner surface a relatively sharp ridge of refractory material.

The invention will be further described with reference to the accompanying drawing, but it is to be understood that the invention is capable of other modifications than the embodiment specifically described, the invention not being limited thereto.

Figure 1:
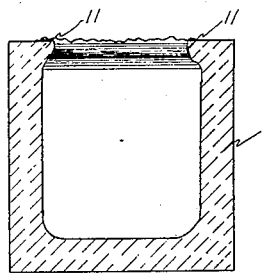
Figure 1 is a cross-section of a hollow refractory article made according to the present invention.

Referring to Figure 1 the improved refractory article of the present invention consists of a shell 10 of dense homogeneous refractory material which has an opening in one face only slightly less in area than the area of the corresponding inner face of the shell, this difference in area being caused by the presence of the re-entrant portion 11 which causes a ridge or ledge around the periphery of the opening.

It is desirable in producing these articles that one wall of the shell, preferably the one opposite the opening, shall have a thickness substantially greater than the adjacent wall whereby the block can be laid to present the thick face to the action of the corrosive slag and glasses, and thus present the maximum effective thickness to such action.

Figure 2:
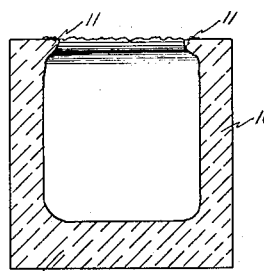
Figure 2 is a cross-section of a hollow refractory article made according to the present invention and having one wall substantially thicker than the adjacent walls.

Referring to Figure 2 a refractory article of this nature is illustrated wherein the shell 10 has a wall 12 which is substantially thicker than the adjacent wall. This construction may be obtained in the article by the method disclosed in our co-pending application Serial No. 56,705, filed December 30, 1935.

Figure 3:
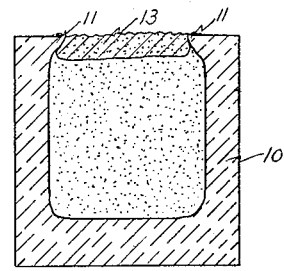
Figure 3 is a cross-section of a refractory block illustrating a third modification of the present invention.

In preparation for use these hollow articles may be filled with insulating material as in Figure 3 or they may be used in their natural hollow state. The insulating material may be placed in the hollow block in a granular condition and retained in place by any suitable means, but preferably by means of a layer of plastic cement 13, which is pressed into place and dried or burned to form a solid contact underneath the re-entrant portion 11 of the block 10. By another method the granular insulating material may be retained in place by sintering it after it is placed in the block whereby it forms a rigid mass which consists of particles sintered together and to the inner walls of the block.

The method of our invention includes the steps of pouring molten material into a suitable mold, allowing the formation of a shell of solidified material adjacent the inner wall of the mold, permitting the deposition of solidified material from the molten center portion until the shell has attained the desired thickness and shape and then pouring out excess molten material. Our invention further involves the formation of a shell which has a re-entrant portion extending about the periphery, preferably adjacent the casting hole, the said re-entrant portion being substantially thinner than adjacent sections of the wall of the shell. The shell is then divided along the re-entrant portion to produce two parts, one including the casting hole and the internal objectionable protuberances described above which occur adjacent the casting hole and a second part consisting of a hollow refractory body open on one face and having well defined substantially uniform walls and corners, but being slightly re-entrant at the opening.

Figure 4:
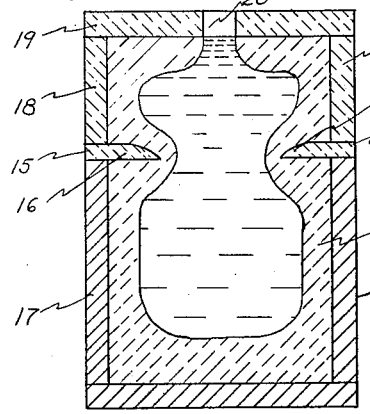
Figure 4 is a cross-section of a mold and hollow block in process of formation illustrating the method of the present invention.

Illustrating this method by reference to the production of a block, we have in Figure 4 illustrated a mold for carrying out this method and the formation of a shell having a re-entrant portion as described above. The mold 14 comprises two sections, a lower section 17, and an upper section 18, the upper section being in the nature of a header. The two sections of the mold may be made of any desired material depending upon the nature of the material being cast and the size and shape of the article to be cast. The two sections may be made of the same material, for example, cast iron or they may be made of different material, for example, section 17 may be made of cast iron, and section 18 may be made of a refractory having a low heat conductivity. This latter construction may be desirable for some purposes because it can be used to retard excessive deposition of solid material in the upper section of the mold where it is unnecessary and may be objectionable. Note however that it is in general that the cross section of the upper portion should be of approximately the same dimensions as the cross section of the lower portion.

The mold may be left uncovered or it may be provided, particularly during the time the walls are forming, with a top portion 19 preferably of refractory material and provided with a casting hole 20 through which the molten material may be introduced into the mold. Inasmuch as the top portion of the shell is to be discarded however, this top 19 of the mold is not necessary but it assists in retarding the deposition of solid material at the top of the mold which might render difficult the removal of the molten material from the shell. Sections 17 and 18 of the mold are separated by wedges 15 of refractory material, for example, graphite, which protrude into the mold and form on the inner surface of the mold refractory ridges 16. These ridges should be relatively thin and sharp pointed and should have their lower side substantially perpendicular to the side wall of the mold to assist in the formation of a sharp corner in the finished block.

Into such a mold molten material is poured to a height sufficient to cover well the ridges 16 with molten material and to insure the absence of any objectionable excessive deposition of material at the ridges. Due to the refractory nature of the wedges and their wedge-shape and low heat capacity and conductivity, the deposition of solid material on the wedges proceeds at a lower rate than elsewhere in the mold due to a lower rate of abstraction of heat at that point. After the side walls of the shell 21 have attained the desired thickness a portion at least of molten material is removed from the shell by breaking a hole in the top portion and pouring out the molten material. A portion of the molten material may be permitted to remain in the shell and deposit on the bottom wall of the shell as disclosed in our co-pending application above referred to, or this step may be omitted and all of the molten material removed from the shell at the same time.

Figure 5:
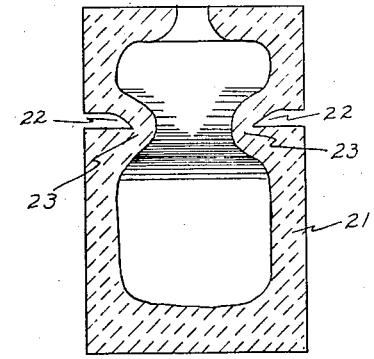
Figure 5 is a cross-section of a block in process of preparation according to the present invention.

Referring to Figure 5, the shell thus formed consists of an upper and lower section corresponding to the sections 17 and 18 of the mold 14, separated by a groove 22 which extends around the shell, and is caused by the presence of ridge 16 in the mold. At the groove the shell wall is preferably somewhat thinner than the remaining walls of the shell.

While the shell is still at a temperature showing visible redness, but after removal of the mold and wedges, a pinch bar may be inserted in the groove 22 to break off the upper portion of the shell 21, with a quick twist of the pinch bar, at the level of the groove 22, thus producing a hollow block as illustrated in Figure 1 in which five sides are closed and the sixth is open and of approximately the full dimensions of the face less the restriction caused by the re-entrant portions 11 which are the lower halves of re-entrant portion 23 of the shell.

For making a hollow block approximately 4" x 4" x 8", useful in the construction of furnaces and glass tanks, the mold may be made of cast iron or other suitable metal and may have walls approximately ½" thick, the wedges being 1" across and approximately 3/16" thick. After casting, the mold may be allowed to stand for 30 seconds to two minutes, depending upon the conditions, after which a hole is broken through the top of the casting and the desired amount of molten material is poured out. The casting may be removed from the mold before or after pouring out the excess molten material and while still at a temperature showing visible redness separated as described above.

Figure 6:
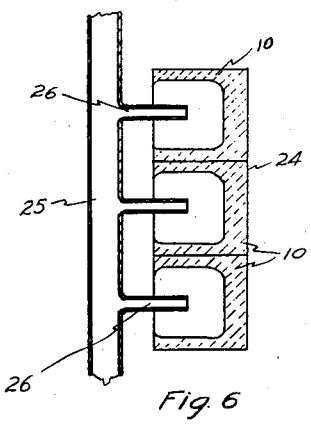
Figure 6 is a cross-section of a portion of a furnace wall illustrating a use for the new refractory article.

One method of utilizing these hollow blocks has been described in connection with Figure 3, another method is shown in Figure 6, in which a series of hollow open-backed blocks 10, preferably having one wall thicker than the remaining walls, is built into a wall in such position that the face 24 is exposed to erosion by molten glass, slag or the like. As a protection for the wall, an air-cooling system is provided in which a duct 25 terminates in a series of nozzles 26 which extend into the open cavities in the block at the rear of the space exposed to the action of the material in the furnace or the tank. Air supplied through these nozzles impinges on the back of the wall exposed to such action and serves to keep the wall cool thus making it possible to build up a layer of congealed slag on the face 24 which protects the block and thus prolongs the life of the refractory material. Similarly in a glass tank, such cooling may be used to prevent the penetration of molten glass through cracks between adjoining blocks.

The peculiar construction of the blocks made according to the present invention adapts them for use in the construction of suspended arches in furnaces, etc.

Figure 7:
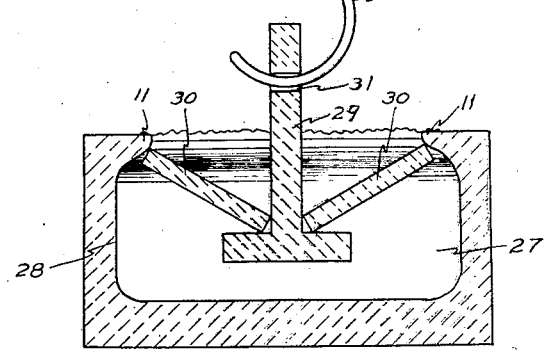
Figure 7 is a cross-sectional view illustrating another use for the new refractory article.

Referring to Figure 7 the open-backed hollow block 10 made as above described has an interior cavity 27 surrounded by lateral walls, the inner faces 28 of which are somewhat rough, being composed of sharp, freely-formed crystalline faces as a result of the method of formation of the casting. At the upper side of these faces 28 there is a re-entrant ledge 11 formed as a result of the method of making the hollow block. This re-entrant ledge 11 extends practically completely around the mouth of the cavity of the casting. In preparing the casting for use in suspended arches a T-shaped piece 29 is inserted into the cavity 18 and pieces 30 are placed at each side of the T as illustrated. Pieces 29 and 30 may advantageously be made of refractory material or heat-resistant metal. After pieces 30 have been inserted so that their outer ends drop below the level of ledge 11, the T is raised, thus wedging the pieces 30 into firm contact with the inner ends of the casting and serving to support the assembly while suspended from the upper end of the T. If desired for additional stability, the T may be fixed in this upward position by insertion of suitable wedges, not shown, between it and the lower face of cavity 27. The T-shaped piece 29 is provided with an aperture 31 through which suitable suspension means, such as a steel hook 32, may be inserted. Suitable adjustment of the height of the suspended lock may be made by the adjustment of the length of the upper arm of hook 32.

We claim:

1. The method of making a refractory article which comprises molding molten refractory material into an intermediate article comprising a solidified outer shell having a casting hole, a re-entrant portion extending about the shell, and a molten center portion, causing deposition of solid material from the said molten center portion on the inner wall of the shell to build it up to the desired shape, removing excess molten material from the shell, and dividing the shell along the re-entrant portion to remove the portion of the shell including the casting hole and produce a hollow refractory article having an opening of substantial area.

2. The method of making a refractory article which comprises molding molten refractory material into an intermediate article comprising a solidified outer shell consisting of a top section including the casting hole, side sections adjacent the top section, and a bottom section, a re-entrant portion extending about the shell in the side sections, and a molten center portion, causing deposition of solid material from the said molten center portion on the inner wall of the shell to build it up to the desired shape, removing the excess molten material from the shell and dividing the shell along the re-entrant portion to remove the portion of the shell including the casting hole and produce a hollow refractory article having an opening of substantial area.

3. The method of making a refractory piece which comprises casting molten refractory material into a mold which has a ridge of refractory material extending about the inner wall of the mold, withdrawing heat from the mold whereby the molten material adjacent the inner wall of the mold solidifies to form a shell of solidified material having a casting hole, a re-entrant portion at the said ridge and extending about the shell, and a molten center portion, causing deposition of solid material from the said molten center portion on the inner wall of the shell to build it up to the desired shape, removing excess molten material from the shell, and dividing the shell along the re-entrant portion to remove the portion of the shell including the casting hole and produce a hollow refractory article having an opening of substantial area.

RAYMOND C. BENNER.
JOHN CHARLES McMULLEN.